May 3, 1966  C. W. ERICKSON  3,249,940
CLUTTER-CANCELLING SYSTEM
Filed Oct. 24, 1963  3 Sheets-Sheet 1

INVENTOR.
CARL W. ERICKSON
BY
ATTORNEYS

INVENTOR.
CARL W. ERICKSON

INVENTOR.
CARL W. ERICKSON

United States Patent Office 3,249,940
Patented May 3, 1966

3,249,940
CLUTTER-CANCELLING SYSTEM
Carl W. Erickson, San Diego, Calif., assignor to the United States of America as represented by the Secretary of the Navy
Filed Oct. 24, 1963, Ser. No. 318,768
8 Claims. (Cl. 343—17.1)

The invention described herein may be manufactured and used by or for the Government of the United States of America for governmental purposes without the payment of any royalties thereon or therefor.

The present invention relates to a clutter cancellation system and more particularly, to an improved clutter cancelling system for use in a radar system and specifically, to a clutter cancelling system for improving peak-to-clutter ratio so that small radar targets are not obscured by clutter from large targets.

At the present time the accepted method of increasing average powers to increase the range capability of long-range, air-search radars, is to use longer pulse lengths. However, long pulses have effect of limiting range resolution. This shortcoming has in turn been overcome by matched filtering which, by resolving long pulses into short pulses, improves range resolution and at the same time maintains a high average power. However, a persistent problem in matched filtering has been the inevitable resi due of clutter resulting from the correlation function.

An object of the present invention is to provide a system for increasing the range capability of long-range, air-search radar.

A further object of the present invention is to provide a means of increasing the peak-to-clutter ratio resulting from the correlation function in matched filtering techniques.

An additional object of the present invention is to provide a system for generating pulse waveforms the autocorrelation functions of which have clutter-cancelling capabilities.

A further object of the present invention is to provide a system for improving peak-to-clutter ratio so that small radar targets are not obscured by clutter from large targets.

Other objects and many of the attendant advantages of this invention will be readily appreciated as the same becomes better understood by reference to the following detailed description when considered in connection with the accompanying drawings wherein.

Figure 1:
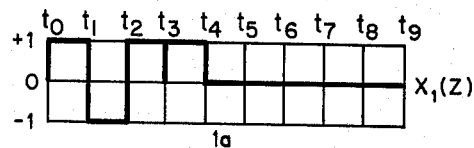
FIG. 1 represents two length-four clutter-cancelling sequences and their autocorrelation functions.
Figure 1:
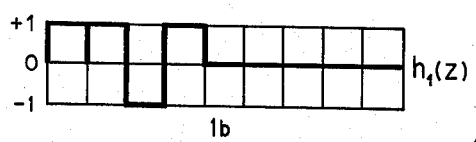
Figure 1:
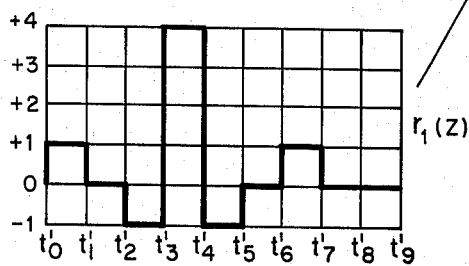
Figure 1:
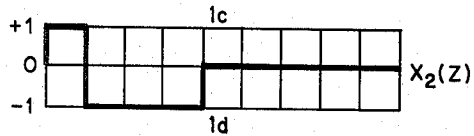
Figure 1:
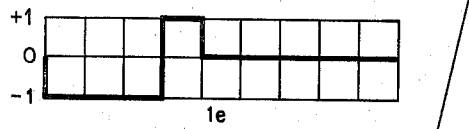
Figure 1:
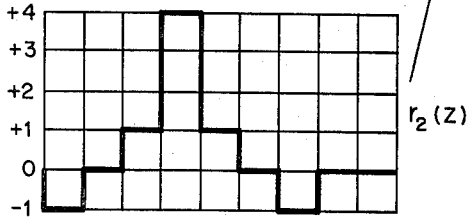
Figure 1:
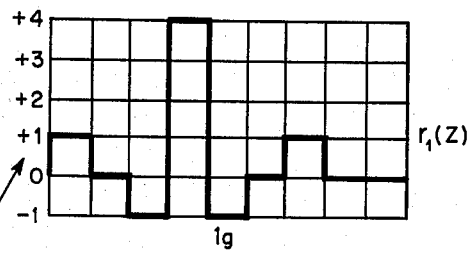
Figure 1:
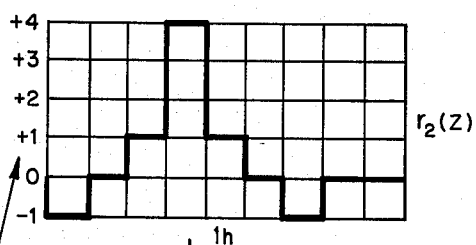
Figure 1:
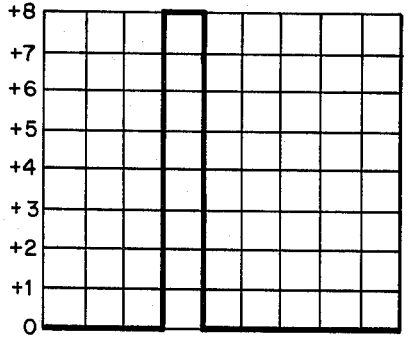

The autocorrelation functions of finite length sequences consisting of plus and minus ones have been studied extensively. With the exception of the so-called optimum sequences, the usual peak-to-clutter ratio of these autocorrelated sequences is very nearly the square root of sequence length. The optimum sequences, having lengths 3, 5, 7, 11, and 13, have very good peak-to-clutter ratios, however, unfortunately for some applications, their length is not long enough.

The method developed to overcome the shortcomings incident to the use of the optimum sequences involves the use of paired sequences in such a manner that complementary correlation functions are produced and clutter eliminated. The sequences of length $2^n$ in complementary pairs is useful when long sequences are of interest and good peak-to-clutter ratios are necessary. These complementary sequences have the property of clutter cancellation, at the same time reinforcing the autocorrelation peak. Sequences of this type have no known upper limit on length so long as they are of length $2^n$. Longer clutter cancelling sequences are created by combining shorter clutter-cancelling sequences. Thus, if one clutter cancelling pair is known, many longer sequences may be written by inspection.

Sequences consisting of plus and minus ones have been investigated extensively because of their ease of generation and visualization. It is possible to generate any desired sequence by using unit delays and phase inverters. The unit of delay can be made up of any convenient means such as delay lines, digital shift registers, etc. A correlator can also be conveniently constructed either by using the same unit delays, or an independent group of unit delays, in such a manner that the time inverse of the generated sequence is the impulse response of the unit delay. This is the definition of a filter that is matched to the input signal. Given the sequence of plus 4 minus ones, the required filter impulse response is then known immediately and the filter can be synthesized directly.

As an example, suppose that the sequence $$(+ - + + - - -)$$

and its autocorrelation function are desired. The filters impulse response must be $(- - - - + + - +)$ the time inverse of the input signal. Assuming that ideal delay lines are used as unit delays, one would have a delay line of length D where D represents a unit of T seconds delay. T is equal to the width of the input pulse $e_i$. Phase inverters would be inserted at appropriate spots on the delay line at interval T to provide the desired phase shift indicated either by a plus or minus. The input signal is a rectangular pulse of unit amplitude and T seconds duration. The generating network generates a desired sequence $X_i(t)$ from the input pulse $e_i$ and the receiving network forms the matched filter for the sequence $X_i(t)$ and has an impulse response $h_i(t)$ which is the time inverse of $X_i(t)$. The autocorrelation function $\gamma(\tau)$ will then be present at the output of the matched filter.

The system could have been described in terms of simple algebraic equations involving Z delay transforms. Let the unit of delay (T) seconds be equal to $Z^{-1}$ and $n$ units of delay be equal to $Z^{-n}$. Then the generated sequence could be represented as $$X_i(Z) = (I - Z^{-1} + Z^{-2} + Z^{-3} - Z^{-4} - Z^{-5} - Z^{-6})f(e_i)$$

the filter impulse response as $$h_i(Z) = -I - Z^{-1} - Z^{-2} + Z^{-3} + Z^{-4} - Z^{-5} + Z^{-6}$$

and the filter output as $$\gamma_0(Z) = X_i(Z)h_i(X) = (-I - Z^{-2} - Z^{-4} + 7Z^{-6} - Z^{-8} - Z^{-10} - Z^{-12})f(e_i)$$

The problem now is not how to represent the sequences but what sequences to represent, because there are a limited number of sequences of plus and minus ones that will yield desirable autocorrelation functions like the sequence represented above. As a matter of fact the only known sequences are for lengths 3, 5, 7, 11, 13, all of which have peak-to-clutter ratios that are equal to their length. For lengths greater than 13, however, the autocorrelation functions are not satisfactory, and only a few sequences can be found with peak-to-clutter ratios that are slightly better than the square root of the sequence length.

If good autocorrelation functions are desired for sequence lengths greater than length 13, it is possible to use two sequences simultaneously to produce complete clutter cancellation while reinforcing the peak. Some sequences from the family of length $2^n$ will give these complementary autocorrelation functions. As an example, let us take two short sequences of length 4 and find their autocorrelation functions.

$$X_1(Z) = + - + +$$
$$= 1 - Z^{-1} + Z^{-2} + Z^{-3}$$
$$h_1(Z) = + + - +$$
$$= 1 + Z^{-1} - Z^{-2} + Z^{-3}$$
$$r_1(Z) = X_1(Z) h_1(Z)$$
$$= (1 - Z^{-1} + Z^{-2} + Z^{-3})(1 + Z^{-1} - Z^{-2} + Z^{-3})$$
$$= 1 - Z^{-2} + 4Z^{-3} - Z^{-4} + Z^{-6}$$
$$X_2(Z) = + - - -$$
$$= 1 - Z^{-1} - Z^{-2} - Z^{-3}$$
$$h_2(Z) = - - - +$$
$$= -1 - Z^{-1} - Z^{-2} + Z^{-3}$$
$$r_2(Z) = X_2(Z) h_2(Z)$$
$$= (1 - Z^{-1} - Z^{-2} - Z^{-3})(-1 - Z^{-1} - Z^{-2} + Z^{-3})$$
$$= -1 + Z^{-2} + 4Z^{-3} + Z^{-4} - Z^{-6}$$

adding the two autocorrelation functions $$r_1(Z) + r_2(Z) = 8Z^{-3}$$

which means that all the clutter has been canceled and after three units of delay there will be a peak of eight units. FIG. 1 is a graphic illustration using waveforms to show the autocorrelation functions and the clutter canceling characteristics of the mathematical expressions developed in the foregoing explanation. It is assumed that a signal may be developed having two distinguishing states and for purposes of explanation the waveforms of FIG. 1 are indicated as having plus and minus states. It is to be understood, however, that the two distinguished states need not be of a polarity type such as the $+1$ and $-1$ states illustrated in FIG. 1 but one state may be distinguished from another by one pulse being of a first frequency and the opposite sense of the pulse being of a second frequency. This aspect of the invention will be explained more fully hereinafter. However, for purposes of initial explanation a function of the type shown by the waveform $X_1(Z)$ designated as waveform 1a in FIG. 1 may be generated by an appropriately connected arrangement of time delay line increments together with phase inverters. In such a suitably arranged circuit, a single pulse having a time period $t_0-t_1$ is impressed upon the circuit as an input and will be successively delayed one, two and three increments of time, each equal to the time period of the initial pulse so as to produce four pulses, the original undelayed pulse and three successively delayed pulses forming a composite four-pulse function. If an input pulse is impressed on a circuit having a direct conductive path from the input to the output without time delay or inversion means it will appear as a plus pulse as indicated in FIG. 1 for the first pulse time increment, $t_0-t_1$.

Assuming that the input pulse goes down a section of delay line which has a delay period equal to the time period of the pulse and is then impressed upon an inverter connected in parallel with the first output, it will appear at the output terminal of the circuit as a minus pulse increment during time period $t_1-t_2$. Assuming still further that the circuit arrangement has a second delay element connected in series with the first delay element, the input pulse will become delayed by two pulse increments of time and if it is not subjected to inversion will appear by parallel connection at the output of the circuit as a plus pulse increment during time period $t_2-t_3$ as illustrated in FIG. 1. Similarly, if a third delay element is connected in series with the previous two delay elements it will delay the input pulse by three pulse period increments and as in the case of the previously developed pulse if it is not operated by a phase inverter will appear by parallel connection at the output as a plus pulse increment during time period $t_3-t_4$. Thus a single pulse input to a circuit having a suitable arrangement of delay elements and inverters will produce an output waveform of the type illustrated by the waveform 1a labeled $X_1(Z)$ in FIG. 1 which is comparable to the mathematical function previously expressed as the series $+ - + +$. The time inverse of that function is represented by the function $+ + - +$ and a circuit comprising delay means and inverter means appropriately connected may be arranged to receive an input of a single pulse to produce a waveform $h_1(Z)$ such as that illustrated at 16 of FIG. 1. When waveform 1a of the configuration designated $X_1(Z)$ in FIG. 1 is transmitted by a radar system and reflected by a target, a return signal will be received which should have substantially the configuration of the transmitted signal. The return signal may be processed by being impressed upon a combined delay line and phase inverter circuit which is the time inverse of the original circuit that developed the transmitted waveform. In this operation a waveform designated $r_1(Z)$ of the type shown and illustrated graphically at 1c of FIG. 1 is developed and that waveform, it will be noted, is three pulse periods longer than the original waveform for the reason that the time inverse circuit imposes upon the received waveform three increments of additional time delay. This concept and its operation may perhaps be better understood by reference to FIG. 2.

Figure 2:
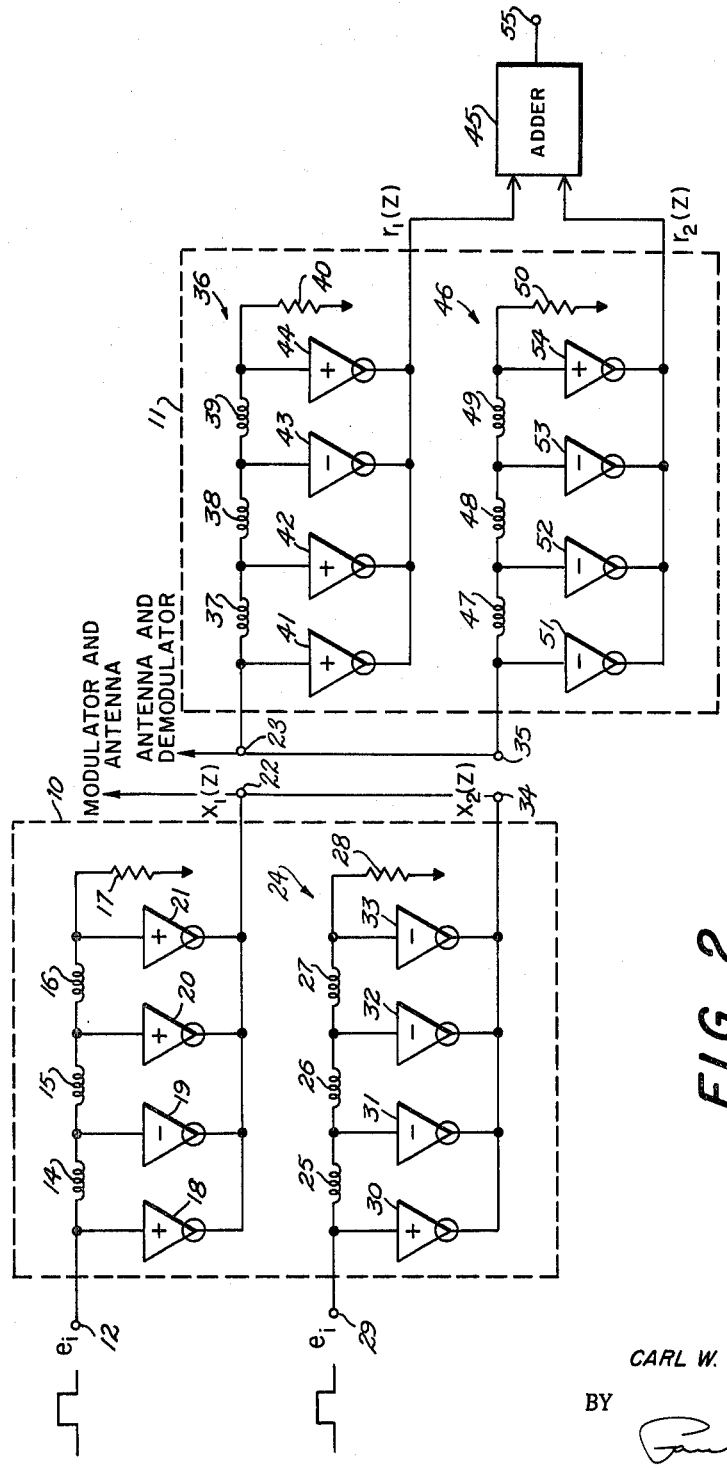
FIG. 2 is a delay-line system block diagram for the two clutter-cancelling sequences described in FIG. 1.

FIG. 2 shows a system block diagram for implementing the method of the present invention. In FIG. 2 the generator for the complementary functions of binary pairs is shown enclosed in block 10 while the matched filters for the receiver are shown in block 11. In FIG. 2 an input pulse $e_i$ is coupled in at input 12 to a first delay line 13 composed of segments 14–16. The delay line 13 is terminated in resistance 17 and phase inverters 18–21 are coupled to the leading and trailing edges of delay line 13 and between each of the individual elements 14–16. The phase inverters 18–21 will provide the desired phase shift indicated either by a plus or minus within the respective square. The output of the phase inverters is then coupled to an output 22 which is indicated in FIG. 2 to be the function $X_1(Z)$. In its application in a radar system the $X_1(Z)$ waveform would be employed to modulate a signal transmitted through an antenna as indicated schematically in FIG. 2. The return signal reflected from a target is received by the antenna, demodulated and impressed upon the input 23 of a circuit of the matched filter type contained within the block designated 11. It should be noted that filter 11 has an upper portion comprising three units of delay line 37, 38 and 39 and appropriately designated phase inverter means 41, 42, 43 and 44 which are the time inverse of the delay filter means in the upper portion of the filter 10 which comprises incremental delay means 14, 15 and 16 and the phase inverters 18, 19, 20 and 21. That is to say, that whereas the delay line and phase inverter arrangement in the upper portion of the filter 10 will provide a waveform at the output terminal 22 which may be expressed by the function $+ - + +$ in that order as illustrated in the uppermost left hand waveform 1a of FIG. 1, contrast, the matched filter arrangement of the upper portion of circuit 11 in response to a single input pulse will produce a waveform of the type illustrated by the second from the top left hand waveform 1b illustrated in FIG. 1 which may be expressed by the function $+ + - +$.

However, the waveform which is reflected from the target and impressed at the input terminal 23 of the filter circuit 11 is not a single pulse but it is four sequential pulse units of the general configuration in time and sense of the waveform 1a of FIG. 1 produced at the output terminal 22 of circuit 10. When such a waveform is processed through the delay circuit in the upper portion of the matched filter 11, the output produced at its terminal is the type of waveform illustrated at 1c in FIG. 1 and designed $r_1(Z)$. The $r_1(Z)$ waveform is developed in the following manner: The first pulse increment of the received waveform proceeds through element 41 and is connected to the output of the upper portion of the matched filter 11 without appreciable delay and unchanged from the sense in which it was impressed upon the circuit as shown in the waveform 1c of FIG. 1 in the time period $t_0'-t_1'$. The same first pulse of the received waveform proceeds down the delay line through the delay element 37 wherein it is delayed for a period of time equal to one pulse width increment and then passes through element 42 to be connected in parallel to the output terminal; however, during the delay of the first pulse, the second pulse of the received waveform, which is a negative pulse, has been received at the input terminal to the circuit and passed through element 41 without delay so that it is coincident in point of time with the delayed first pulse. By parallel connection of elements 41 and 42 of the filter 11 both the delayed first pulse and the undelayed second pulse appear at the output of the filter at the same time and since one pulse has a plus sense and the other has a minus sense, there is a zero resultant output for the second pulse time increment of the waveform as shown for the time period $t_1'-t_2'$ of waveform 1c of FIG. 1.

When the third pulse reaches the input terminal 23 the circuit 11, the previous two pulses have proceeded down the delay line so that the positive pulse which was the first pulse increment of the input waveform, has now been delayed two units of time by reason of passage through delay elements 37 and 38 and has been processed through element 43, which is to be noted, is a minus element of a phase inversion type thereby producing a minus pulse output connected in parallel with the outputs of the other elements of the circuit. The second pulse of the input waveform has now passed through delay line element 37 and since the second pulse was of a minus character in its original input state, it remains as having a minus character after passing through element 42 of the filter and is added in the parallel at the same point in time to the minus output of element 43. However, during this same period the third pulse passes through element 41 without any delay and so is added at the same point in time as a plus pulse to the two minus pulses developed as has already been described. Therefore, at this point in time there is a total resultant pulse increment having an amplitude of one unit and of minus sense as shown for the time period $t_2'-t_3'$ of waveform 1c of FIG. 1.

As the fourth pulse unit of the input waveform is impressed upon the upper portion of the matched filter 11, the first three pulses have proceeded down the delay line so that the first pulse has been delayed three units of time by passage through delay elements 37, 38, 39 and is processed through element 44 so that it appears as a plus pulse unit at the output. The second pulse has been delayed two units of time by passage through delay elements 37 and 38 and having been a minus pulse element originally, is phase inverted by passage through element 43 so that it too becomes a plus pulse element at the output. The third pulse element, which was initially of a plus character, is delayed one pulse unit of time by passage through delay element 37 and is passed through element 42 so that it remains a plus pulse element at the parallel connected output. The fourth pulse which is not delayed at all is a plus pulse element and passes through element 41 of the matched filter 11 without delay and remains a plus pulse element. All four outputs appear simultaneously at the parallel connected outputs of elements 41, 42, 43 and 44 and are coincident in point of time. Since all the outputs are of a plus character a pulse increment having a +4 amplitude is developed as shown at the pulse period $t_3'-t_4'$ of waveform 1c of FIG. 1.

The input pulses continue to proceed down the delay line and during the next pulse period of time, the second pulse appears as the output of element 44 and having originally been a minus pulse, produces a pulse output having a minus sense. The third pulse appears at the output of element 43 and having originally been a plus pulse, appears as a minus pulse element due to the phase inversion of element 43. The fourth pulse appears at the output of element 42 having originally been a plus pulse element, appears at a plus pulse output to be added to be previously described outputs of elements 43 and 44 both of which were minus. Therefore, the total aggregate output for the coincident period of time $t_4'-t_5'$ is a single minus pulse unit as shown in wave form 1c of FIG. 1.

The fourth pulse of the input waveform proceeds down the delay line during the next pulse period, through delay unit 38 and phase inversion element 43. The fourth pulse, having originally been a plus unit, is accordingly converted to a minus pulse unit at the output of element 43. During the same time period, the third pulse of the input waveform has been delayed another unit of time by passage through the delay element 39 and flows through element 44. The third pulse of the input waveform remains unchanged from its plus pulse sense and appears at the output of element 44 as a plus pulse unit. Therefore, the two which are added in parallel connection to appear at the output terminal at this point in time cancel each other and produce a zero output as is indicated at the time period $t_5'-t_6'$ of waveform 1c of FIG. 1. During the next time period, $t_6'-t_7'$, the fourth pulse is delayed another period of time by proceeding through delay element 39 and processed through element 44 which is a plus unit so that a single plus pulse unit appears at the output, the first, second and third pulse increments of the waveform having already passed through the combination of phase inverters and delay line elements at this point in time. The fourth pulse of the input waveform thus appears as a single plus pulse unit at the time period $t_8'-t_9'$ as shown in waveform 1c of FIG. 1. Thus the waveform 1c labeled $r_1(Z)$ of FIG. 1 is developed from an input waveform of the type 1a designated in FIG. 1 $X_1(Z)$ processed through the upper portion of matched filter 11 which portion is the inverse time sequence of the delay and phase filter circuit in the upper portion of element 10.

The circuit for generating the complementary function of that generated by the upper portion of generator 10 is shown in the lower portion of generator 10 and comprises a delay line 24 composed of individual delay elements, 25, 26 and 27 terminated in a characteristic impedance 28. An input $e_i$ of the type illustrated in FIG. 2 is impressed upon the circuit at the input terminal 29 to the delay line and the phase inverters 30, 31, 32 and 33 are connected to the delay line 24 at points between each discrete element of the delay elements 25, 26 and 27. The outputs of the phase inverter are connected in parallel to a common bus terminating in an output terminal 34 which as, in the case previously described, is connected with the upper portion of the generator shown at 10 and will ordinarily be connected to means for modulating a carrier frequency and providing an output signal to be transmitted by a radar system, for instance.

The received signal, as reflected from a radar target, is impressed upon the input terminal 35 of the lower portion of the matched filter arrangement of element 11 of the system as illustrated in FIG. 2. The waveform reflected from a radar target is substantially of the configuration illustrated by waveform 1d of FIG. 1 and is processed through the matched filter shown in the lower portion of element 11 of FIG. 2 in a manner analogous to that previously described in connection with the operation of the matched filter in the upper portion of element 11, producing an output waveform of the configuration shown at waveform 1f in FIG. 1 which is the $r_2(Z)$ waveform previously defined mathematically. The two waveforms 1c and 1f designated as $r_1(Z)$ and $r_2(Z)$ in FIG. 1 are added in an appropriate circuit arrangement indicated by the adder 45 of FIG. 2 and produce an output at its output terminal 55 which is as shown as waveform 1i which is the resultant function previously defined mathematically.

It should be noted that the two complementary waveform functions, when subjected to autocorrelation and combined in accordance with the teaching and concept of the present invention, produce a resultant single pulse width element of maximum intensity designating the target within relatively fine resolution as contrasted to the pulse width of the transmitted waveforms and in the present illustration the improved resolution is shown to be four times better than the transmitted pulse. In other words, the target is indicated within a single pulse increment rather than within four pulse increments which is the width of the transmitted pulse and additionally has an amplitude of approximately four times that of any single received pulse.

The sequence $X_1(Z)$ may be represented more generally by $$X_a(Z) = a_0 + a_1 Z^{-1} + a_2 Z^{-2} + \ldots + a_{l-1} Z^{-(l-1)} = \sum_{J=0}^{l-1} a_J Z^{-J} \quad (1)$$

where
$l = 2^n =$ sequence length
$a_J =$ plus and minus ones

The filter response function $$h_a(Z) = a_{l-1} + a_{l-2} Z^{-1} + \ldots + a_0 Z^{-(l-1)} = \sum_{K=0}^{l-1} a_{(l-1-K)} Z^{-K}$$

multiplying both sides by $Z^{(l-1)}$ and rearranging terms $$Z^{(l-1)} h_a(Z) = a_0 + a_1 Z^{+1} + a_2 Z^{+2} + \ldots + a_{l-1} Z^{+(l-1)} = \sum_{K=0}^{l-1} a_K Z^{+K} \quad (2)$$

$$h_a(Z) = Z^{-(l-1)} \sum_{K=0}^{l-1} a_K Z^{+K}$$

In a physically realizable system $Z^{-(l-1)}$ must be present because the autocorrelation peak cannot occur before the complete sequence has been generated. So then the autocorrelation function may be represented by $$r_a(Z) = h_a(Z) X_a(Z) = Z^{-(l-1)} \sum_{K=0}^{l-1} \sum_{J=0}^{l-1} a_K a_J Z^{K-J} \quad (3)$$

The complementary sequence and filter function are then $$X_b(Z) = \sum_{J=0}^{l-1} b_J Z^{-J} \quad (4)$$

$$h_b(Z) = Z^{-(l-1)} \sum_{K=0}^{l-1} b_K Z^{+K} \quad (5)$$

and $$r_b(Z) = h_b(Z) X_b(Z) = Z^{-(l-1)} \sum_{K=0}^{l-1} \sum_{J=0}^{l-1} b_K b_J Z^{K-J} \quad (6)$$

The sum of the two autocorrelation functions then represents the composite waveform with no clutter and a peak of $2l$.

$$(r_a + r_b) = Z^{-(l-1)} \sum_{K=0}^{l-1} \sum_{J=0}^{l-1} (a_K a_J + b_K b_J) Z^{K-J} \quad (7)$$

$$r_a + r_b = 2l Z^{-(l-1)}$$

When two clutter-cancelling sequences are used simultaneously a peak of $2l$ occurs after $Z^{-(l-1)}$ units of delay. Given two clutter-cancelling sequences of length, $l$, new clutter-cancelling sequences of length $2l$ can be constructed by breaking the given sequences into equal length segments ($l$ or $l/2$ or $l/4$ or $l/8$ or … $l/l$). The segments from one sequence are alternately added to the ends of the other sequence to form a new sequence of length $2l$. The new complementary sequence is formed in the same manner except that one of the original length $l$ sequences is multiplied by $-1$ before it is divided into segments.

As an example, two length ($l = 4$) clutter-cancelling sequences.

$$X_1(Z) = \sum_{J=0}^{l-1} a_J Z^{-J} = a_0 + a_1 Z^{-1} + a_2 Z^{-2} + a_3 Z^{-3}$$

$$X_2(Z) = \sum_{J=0}^{l-1} b_J Z^{-J} = b_0 + b_1 Z^{-1} + b_2 Z^{-2} + b_3 Z^{-3}$$

can be combined to form length $2l$ by breaking each into (1) segment or (2) segments or (4) segments, where the number of segments (S) must be equal to $2^m$ and for this example ($m = 0, 1,$ or $2$).

If we now let $a_0 = +$      $b_0 = +$
$a_1 = -$      $b_1 = -$
$a_2 = +$      $b_2 = -$
$a_3 = +$      $b_3 = -$ and substitute these values into Table 1 we get the list of clutter-cancelling plus and minus one sequences in Table 2.

It can be seen that the list is redundant, however, because the last two sequences must give the same autocorrelation functions. One can say, then, that addition of varying length segments will always give a clutter-cancelling sequence but not always a new clutter-cancelling sequence.

TABLE 1.—LENGTH 8 SEQUENCES CONSTRUCTED FROM LENGTH 4 SEQUENCES WITH 1, 2, AND 4 SEGMENTS

| S | $X_1(Z) + X_2(Z)$ |
|---|---|
| 1 | $a_0 + a_1 Z^{-1} + a_2 Z^{-2} + a_3 Z^{-3} + b_0 Z^{-4} + b_1 Z^{-5} + b_2 Z^{-6} + b_3 Z^{-7}$ |
| 2 | $a_0 + a_1 Z^{-1} + b_0 Z^{-2} + b_1 Z^{-3} + a_2 Z^{-4} + a_3 Z^{-5} + b_2 Z^{-6} + b_3 Z^{-7}$ |
| 4 | $a_0 + b_0 Z^{-1} + a_1 Z^{-2} + b_1 Z^{-3} + a_2 Z^{-4} + b_2 Z^{-5} + a_3 Z^{-6} + b_3 Z^{-7}$ |

The complementary sequence would be:

| S | $X_1(Z) - X_2(Z)$ |
|---|---|
| 1 | $a_0 + a_1 Z^{-1} + a_2 Z^{-2} + a_3 Z^{-3} - b_0 Z^{-4} - b_1 Z^{-5} - b_2 Z^{-6} - b_3 Z^{-7}$ |
| 2 | $a_0 + a_1 Z^{-1} - b_0 Z^{-2} - b_1 Z^{-3} + a_2 Z^{-4} + a_3 Z^{-5} - b_2 Z^{-6} - b_3 Z^{-7}$ |
| 4 | $a_0 - b_0 Z^{-1} + a_1 Z^{-2} - b_1 Z^{-3} + a_2 Z^{-4} - b_2 Z^{-5} + a_3 Z^{-6} - b_3 Z^{-7}$ |

TABLE 2.—SEQUENCES OF LENGTH-8 FROM TABLE 2 FOR TWO SPECIFIC LENTH-4 CLUTTER-CANCELLING CODES

| S | $X_1(Z) + X_2(Z)$ | $X_1(Z) - X_2(Z)$ |
|---|---|---|
| 1 | + − + + + − − − | + − + + − + + + |
| 2 | + − + − + + − − | + − − + + + + + |
| 4 | + + − − + − + − | + − − + + + + + |

The general expressions for constructing complementary sequences of length $2l$ from complementary sequences of length $l$ are:

$$X_1(Z) \sum_{J=0}^{2l-1} C_J Z^{-J} \quad \begin{array}{l} \text{The new sequence created} \\ \text{from the two length } l \\ \text{clutter-cancelling sequences} \end{array} \quad (8)$$

$$X_2(Z) = \sum_{J=0}^{2l-1} D_J Z^{-J} \quad \begin{array}{l} \text{The new complementary} \\ \text{sequence} \end{array} \quad (9)$$

$$\sum_{J=0}^{2l-1} D_J Z^{-J} = \sum_{i=1}^{S} \sum_{J=(i-1)l/S}^{il/S-1} (a_J + b_J Z^{-l/S}) Z^{-J} Z^{-(i-1)l/S} \quad (10)$$

$$\sum_{J=0}^{2l-1} D_J Z^{-J} = \sum_{i=1}^{S} \sum_{J=(i-1)l/S}^{il/S-1} (a_J - b_J Z^{-l/S}) Z^{-J} Z^{-(i-1)l/S}$$

(11)

where $l = 2^n$ is the length of the original clutter-cancelling sequence $n =$ an integer $S = 2^m$ is the number of segments that are to be formed from the original sequence $m = 0, 1, 2, 3, \ldots,$ $l/S = 2^{n-m}$ is the length of each segment The general filter functions are $$h_1(Z) = Z^{-(2l-1)} \sum_{K=0}^{2l-1} C_K Z^{+K}$$

(12)

$$h_2(Z) = Z^{-(2l-1)} \sum_{K=0}^{2l-1} D_K Z^{+K}$$

(13)

$$Z^{-(2l-1)} \sum_{K=0}^{2l-1} C_K Z^{+K} = Z^{-(2l-1)} \sum_{h=1}^{S} \sum_{K=(h-1)l/S}^{hl/S-1} (a_K + b_K Z^{+l/S}) Z^{+K} Z^{+(h-1)l/S}$$

(14)

$$Z^{-(2l-1)} \sum_{K=0}^{2l-1} D_K Z^{+K} = Z^{-(2l-1)} \sum_{h=1}^{S} \sum_{K=(h-1)l/S}^{hl/S-1} (a_K - b_K Z^{+l/S}) Z^{+K} Z^{+(h-1)l/S}$$

(15)

and the general equation for the composite correlation function is then given by $$h_1(Z)X_1(Z) + h_2(Z)X_2(Z) = Z^{-(2l-1)} \sum_{K=0}^{2l-1} \sum_{J=0}^{2l-1} (C_K C_J + D_K D_J) Z^{K-J} = 2Z^{-(2l-1)} \sum_{h=1}^{S} \sum_{i=1}^{S} \sum_{K=(h-1)l/S}^{hl/S-1} \sum_{J=(i-1)l/S}^{il/S-1}$$

(16)

$$(a_K a_J + b_K b_J) Z^{K-J} Z^{(h-1)l/S}$$

(17)

which is exactly the same as the equation for the composite autocorrelation of two clutter-cancelling sequences of length $l$ except that the function is autocorrelated in segments rather than over the entire sequence. It should be noted that the peak is now twice the magnitude of the two original sequences of length, $l$, and now appears after $Z^{-(2l-1)}$ units of delay. This is exactly what one would expect of two clutter-cancelling sequences with length $2l$. All clutter-cancelling sequences for the next length ($2l$) may be obtained by solving Equations 10 and 11 for each allowable segment length ($S=2^m$) and by using all the clutter-cancelling pairs of length ($l$). It is more convenient, however, to write a list of only the nonredundant clutter-cancelling sequences (where redundancy is defined as sequences that yield the same autocorrelation functions) and solve Equations 10 and 11 for the four following arrangements.

$$X_1(Z) = \sum_{i=1}^{S} \sum_{J=(i-1)l/S}^{il/S-1} g_J Z^{-J} Z^{-(i-1)/l S}$$

$$X_2(Z) = \sum_{i=1}^{S} \sum_{J=(i-1)l/S}^{il/S-1} g_J' Z^{-J} Z^{-(i-1)l/S}$$

$g_{J1} = (a_J + b_J Z^{-l/S}) \quad g_{J1}' = (a_J - b_J Z^{-l/S})$
$g_{J2} = (b_J + a_J Z^{-l/S}) \quad g_{J2}' = (b_J - a_J Z^{-l/S})$
$g_{J3} = (a_J + b_J^* Z^{-l/S}) \quad g_{J3}' = (a_J - b_J^* Z^{-l/S})$
$g_{J4} = (b_J^* + a_J Z^{-l/S}) \quad g_{J4}' = (b_J^* - a_J Z^{-l/S})$ where $b_J^*$ is the time inverse of $b_J$ thereby obtaining a complete list of all clutter-cancelling sequences of length $2l$.

Figure 3:
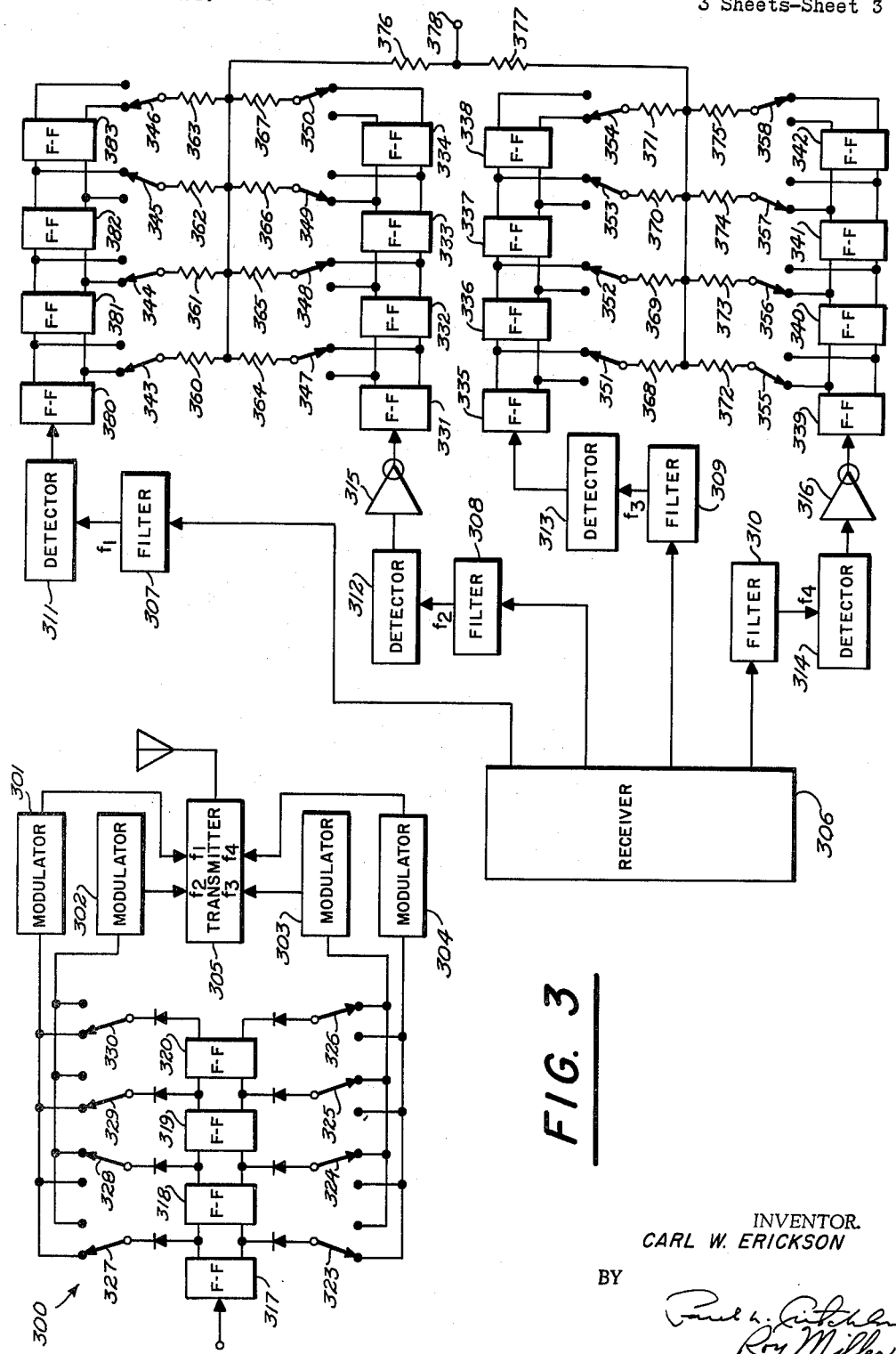
FIG. 3 represents a clutter-cancelling sequence generator and matched filter using binary shift registers.

FIG. 3 illustrates a system for generating a clutter cancelling sequence and the associated matched filters using binary shift registers. In FIG. 3 a sequence generator 300, amplitude modulators 301 and 304 and transmitter 305 comprise the transmitting portion of the system. At the receiver end there is shown a receiver 306 for receiving the four channels of information, four filters 307–310 and amplitude detectors 311–314 associated with the filters 307–310, respectively. In addition an inverter 315 is connected in series with the output of amplitude detector 312 and inverter 316 connected in series with the output of amplitude detector 314. The outputs from amplitude detector 311, inverter 315, amplitude detector 313 and inverter 316 are coupled to the binary shift registers which constitute the matched filters for obtaining the autocorrelation function of the transmitted binary sequence pairs.

The binary sequence generator comprises a series of flip-flops 317–320. It is to be understood that any number of flip-flops might be shown however, for the purpose of the present illustration only four are shown. The input function $e_i$ is impressed upon the input terminal of flip-flop 317. The dual outputs from the respective flip-flops are connected to associated switches such as switches 323–326 associated with the lower line of flip-flops 317–320, respectively, and switches 327–330 associated with the upper output from the respective flip-flops. The individual switches are two position switches and the plus or minus function is set to generate the desired complementary functions. The switches 323, 324, 325, 326, 327, 328, 329 and 330 may be set manually or may be automated to be set to a particular position as desired in accordance with a predetermined program by appropriate actuating means. Changing the position of these switches is the equivalent of changing the phase inverter means of the system illustrated in FIG. 2 and the flip-flops 317, 318, 319 and 320 provide the requisite delay between the generated pulses. For the purposes of illustrating the present invention the switches are set as shown. In that a flip-flop is a two state device and the associated switches each have two states there will be four outputs from the generator 300 which are coupled to their associated amplitude modulators 301–304 for modulating an individual carrier the modulators 301 and 302 may be employed to modulate two different frequencies $f1$ and $f2$, respectively, and similarly modulators 303 and 304 may be employed to modulate different frequencies $f3$ and $f4$, respectively as indicated in FIG. 3. If it is desired, the modulated frequencies $f3$ and $f4$ may be delayed with respect to the transmission of modulated frequencies $f1$ and $f2$ so that at no time will two different frequencies be transmitted at the same instant. If such an arrangement of delayed transmission is employed, the receiver 306, the detailed operation of which will be explained more fully hereinafter, will preferrably include a delay means to delay the received modulated frequencies $f1$ and $f2$ so as to compensate for the initial delay impressed upon frequencies $f3$ and $f4$ before transmission. The outputs from the amplitude modulators 301–304 are then coupled to transmitter 305 for transmission.

The returns received from a target in space are received at receiver 306 and channeled to filters 307, 308, 309 and 310 as indicated in FIG. 3. The filters 307, 308, 309 and 310 are adapted to selectively filter out all but the frequencies as indicated so as to provide separation of the received modulated frequencies and provide inputs having carrier frequencies $f1$, $f2$, $f3$ and $f4$ to the detectors 311, 312, 313 and 314, respectively. The amplitude detectors provide the waveform which had appeared at the output of the function generator, i.e., a series of pulses. The inverter is utilized to position the pulse in the original train of pulses as originally placed, i.e., original ideal pulse train which consists of a series of plus and minus pulses however, at the output of the amplitude detector there are only positive pulses. Therefore, the inverter is used to provide the negative pulse in its proper negative position. The respective channels are then coupled to flip-flops 380–383 associated with channel 1; flip-flops 331–334 associated with channel 2; flip-flops 335–338 associated with channel 3; and flip-flops 339–342 associated with channel 4. Again switches are provided on the outputs of the flip-flops, i.e. each of the flip-flops has two outputs in that it is a two state device and either of the outputs, corresponding to a plus or minus, is coupled to a switch associated with a respective flip-flop. In the present invention switches 343–346 are associated with flip-flops 327–330; switches 347–350 are associated with flip-flops 331–334; switches 351–354 are associated with flip-flops 335–338 which, it should be noted are positioned to be the time inverse of the positions of switches 327–330 of the pulse sequence generator 300, and switches 347–350 are positioned conversely to the positions of switches 343–346; and switches 355–358 are asosciated with flip-flops 339–342 which are positioned to be the time inverse of the positions of switches 323–326 of the pulse sequence generator 300 and switches 351–354 are positioned conversely to switches 355–358. Resistors 360–363 are coupled to switches 343–346; resistors 364–367 coupled to switches 347–350; resistors 368–371 coupled to switches 351–354 and resistors 372–375 coupled to switches 355–358. The outputs from flip-flops 380–382 and 331–334 are summed on a common buss and connected through a limiting resistor 376 to output 378. In the same fashion the outputs of flip-flops 335–338 and 339–342 are summed on a common buss and connected through a limiting resistor 377 to output 378. In that the output of resistor 376 and 377 have a common connection the overall function will be the sum of the two outputs from the two sets of flip-flops and will provide the autocorrelation function incorporating the clutter-cancelling feature and the impulse response will be equal to the sum of the lengths of the binary sequence pairs utilized.

It is ot be understood that any desired clutter-cancelling sequence could be generated and autocorrelated however, for the purposes of the present invention the switches are set as shown and design is assigned for the purposes of illustrating a specific embodiment of the invention.

While the systems illustrated and explained in the embodiments of FIGS. 2 and 3 have been indicated to be adaptable to employing different frequencies to distinguish between the two senses of pulse modulation employed in accordance with the concept of the employment of autocorrelation techniques conceived and taught by the present invention, it should be understood that a phase modulation or other suitable means and techniques may be employed equally as effectively as different frequencies without deviating from the spirit and scope of the present invention. Similarly, the switch means as shown, particularly in the embodiment of FIG. 3, may be adapted to automatic programming in accordance with any predetermined desirable function which is expressable in terms of a waveform for utilization in the correlation and matching techniques as taught by the present invention.

The system and method illustrates a means of obtaining long range capability for long-range, air-search radar. It also provides a means for increasing the peak-to-clutter ratio resulting from the correlation function and matched filtering techniques which is practical and capable of implementation. The present method also demonstrates a means wherein binary code pairs may be developed for writing longer clutter-cancelling sequences the autocorrelation functions of which have clutter-cancelling capability. This in turn represents an increase in peak-to-clutter ratio so that the small radar targets are not obscured by the clutter from large targets in a general area.

Obviously many modifications and variations of the present invention are possible in the light of the above teachings. It is therefore to be understood that within the scope of the appended claims the invention may be practiced otherwise than as specifically described.

What is claimed is:

1. A clutter-cancelling system for increasing the peak-to-clutter ratio resulting from the correlation function in matched filtering techniques comprising:

means for developing signals having two distinguishing states;

means for generating signal pulses in a first sequence of said two distinguishing states;

means for generating signal pulses in a second sequence of said two distinguishing states;

means for transmitting said first and second sequences of signal pulses;

means for receiving reflections of said transmitted first and second sequences of signal pulses;

first and second matched filter means for separately correlating said reflected first and second sequences of signal pulses, each said filter means being operatively responsive in the inverse time sequence of the respective original sequence of the transmitted signal from which said reflected signals are derived;

said first and second sequences being chosen to produce autocorrelated outputs from said matched filter means having mutually cancelling clutter elements and additive peak elements.

2. A clutter-cancelling system as set forth in claim 1 wherein:

said means for generating said first and second sequences of pulses comprise unit delays.

3. A clutter-cancelling system as set forth in claim 2 wherein:

said unit delays comprise delay lines.

4. A clutter-cancelling system as set forth in claim 2 wherein:

said unit delays comprise digital shift registers.

5. A clutter cancelling system as set forth in claim 1 wherein:

the said two distinguishing states of said signals comprises two different frequencies.

6. A clutter cancelling system as set forth in claim 1 wherein:

said matched filter means comprises unit delays; and said unit delays comprise delay line elements.

7. A clutter cancelling system as set forth in claim 1 wherein:

said matched filter means comprises unit delays;

said delay units being composed of digital shift registers.

8. A clutter-cancelling system as set forth in claim 1 and further including:

summation means operatively receiving the output from said first and second matched filter means for summing said outputs.

No references cited.

CHESTER L. JUSTUS, *Primary Examiner.*

R. D. BENNETT, *Assistant Examiner.*